United States Patent Office 3,330,297
Patented July 11, 1967

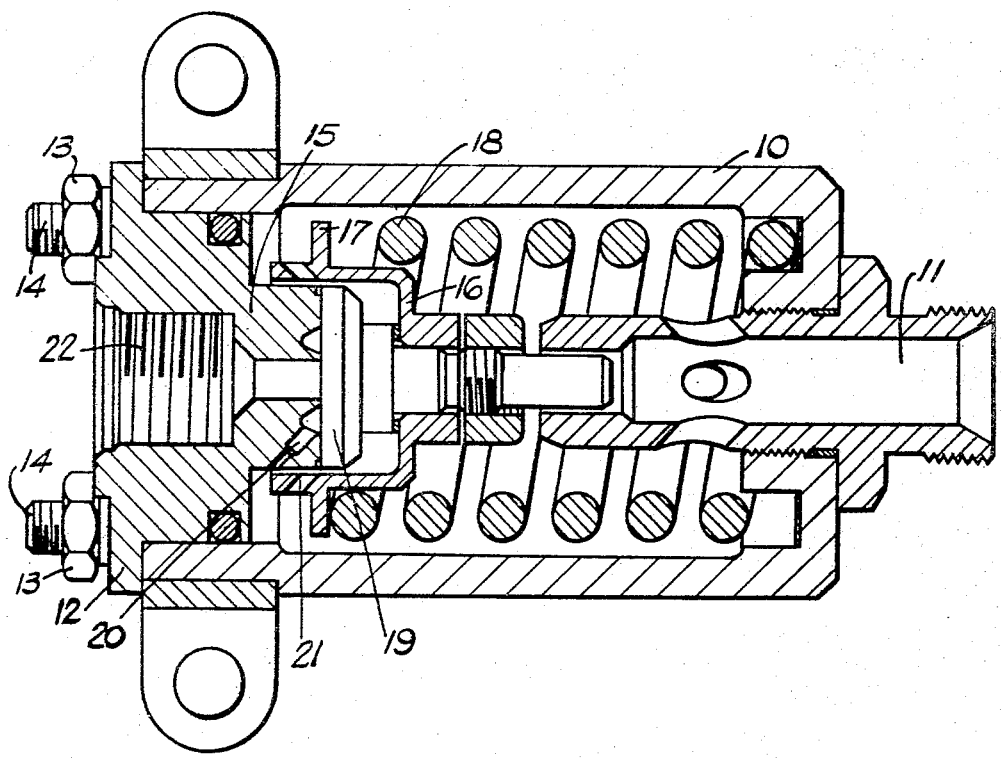

3,330,297
FLUID PRESSURE RELIEF VALVES
Dorian Farrar Mowbray, Solihull, England, assignor to Joseph Lucas (Industries) Limited, Birmingham, England
Filed June 29, 1964, Ser. No. 378,729
Claims priority, application Great Britain, July 9, 1963, 27,085/63
1 Claim. (Cl. 137—469)

This invention relates to fluid pressure relief valves and has for its object to provide such a valve in a convenient form.

A relief valve in accordance with the invention comprises a hollow body part having a fluid outlet at one end thereof, a closure member serving to close the other end of the body part, a hollow spigot formed on or secured to said closure member, said spigot extending inwardly towards said one end of the body part, a fluid inlet to the interior of the spigot, a valve seating formed at the inner end of said spigot, a cup member slidably mounted on the spigot, a valve closure member carried by the cup member for co-operation with the seating, resilient means interposed between the cup member and said one end of the body part for urging the closure member onto the seating, at least one passage for the escape of fluid from the interior of the spigot to the outlet when the valve closure member is lifted from its seating, said passage being so positioned that the flow of fluid therethrough is restricted when the closure member is in contact with the seating by overlap of the cup member and spigot, and as the closure member is lifted from its seating, against the action of the resilient means, when the pressure of fluid at the inlet exceeds a predetermined value, the degree of restriction to the flow of fluid through the passage is reduced.

One example of the invention will be described with reference to the accompanying drawings in which the single figure is a cross-sectional view of a relief valve constructed in accordance with the invention.

In this example there is provided a hollow cup-shaped body part 10 having at one end a fluid outlet 11. The other end of the body part 10 is closed by a closure member 12 which, for convenience, is secured by nuts 13 engaging on studs 14 on the body part 10. Moreover, formed on the closure member 12 and extending inwardly into the body part is a hollow spigot 15 which has a valve seating formed on its inner end. Surrounding the spigot 15 is a cup member 16 having formed on its side wall, a flange 17 between which and said one end of the body part 10 is mounted a coiled compression spring 18. Carried by the cup member 16 is a valve closure member 19 which is urged by the spring 18 against the seating. A tubular extension of the outlet 11 supports a stem portion of the valve closure member 16.

In the spigot is formed at least one, and in this case, a first series of passages 20, the outer end of each of which is partially covered by the free edge of the cup member 16, when the closure member 19 is in contact with its seating, to restrict flow of fluid through the passages 20, the degree of restriction being reduced as the closure member 19 lifts off its seating. One or, in this case a further series of passages 21 are formed in the cup member 16 and each of these further pasasges 21 is partially covered by the inner end of the spigot.

The bore 22 in the spigot 15 is adapted for connection to a source of fluid, the pressure of which it is desired to control and the arrangement is such that when the pressure at the inlet exceeds a predetermined value, the valve closure member 19 will be moved away from the seating against the action of the spring 18, to relieve the pressure at the inlet, thus increasing the area of the closure member 19 against which the pressure in the inlet will act. With initial movement of the closure member, fluid will flow through the first series of passages 20, there also being a flow through the second series of passages 21. As the flow of fluid increases, the closure member 19 will move further away from the spigot 15 until the entire area of the face of the closure member 19 is subjected substantially uniformly to the pressure existing in the inlet 22, and at this stage, the openings 21 will take the major portion of the flow of fluid through the valve to the outlet 11, the position of the cup-shaped member 16 also playing a part in determining the quantity of fluid which can escape through the openings 21.

Having thus described my invention what I claim as new and desire to secure by Letters Patent is:

A pressure relief valve comprising a hollow valve body having a fluid outlet at one end thereof and a closure member closing its other end; a spigot including an inlet passage on said closure member extending into said hollow valve body and toward said other end; said spigot having a lateral external surface terminating in an extended planar surface; a valve means having a cup member surrounding said spigot in spaced relation and forming therewith an annular discharge passage means for the escape of fluid; said spigot having a second passage means extending between the planar surface and the lateral external surface thereof, said second passage means being positioned so as to be covered by the cup member when the valve means is in seated position and uncovered when the valve means is in unseated position; said valve means including an extended planar surface adapted to cooperate with said spigot planar surface; means urging said valve means to normally seat said valve means planar surface against said spigot planar surface; and at least one further passage means formed in said cup member for the escape of fluid, whereby, when the pressure in said inlet passage exceeds a predetermined value, said valve means is unseated and pressure in excess of said predetermined value is relieved.

References Cited

UNITED STATES PATENTS

| 2,286,713 | 6/1942 | Burks | 137—510 X |
| 2,904,616 | 9/1959 | Koepke | 137—469 X |
| 3,131,720 | 5/1964 | Horvath | 137—469 X |

FOREIGN PATENTS

| 103,383 | 1/1917 | Great Britain. |
| 318,457 | 9/1929 | Great Britain. |

WILLIAM F. O'DEA, Primary Examiner.
HAROLD WEAKLEY, Examiner.